United States Patent [19]

Walther et al.

[11] 3,893,921
[45] July 8, 1975

[54] FLOCCULATION DEVICE FOR WASTE FLUID TREATMENT

[75] Inventors: Carl Kurt Walther, Wuppertal-Vohwinkel; Klaus Beckschäfer, Kaarst; Karl E. Temme, Wuppertal, all of Germany

[73] Assignee: Wheelabrator-Frye Inc., New York, N.Y.

[22] Filed: Nov. 27, 1973

[21] Appl. No.: 419,261

[52] U.S. Cl. ............... 210/206; 209/446; 259/72
[51] Int. Cl. ............................................ B01f 9/00
[58] Field of Search .......... 210/144, 205, 206, 209, 210/219, 167; 259/72, DIG. 42; 134/92, 109, 117, 118, 201; 209/5, 437, 446, 500

[56] References Cited
UNITED STATES PATENTS

| | | | |
|---|---|---|---|
| 2,033,121 | 3/1936 | Chambers | 259/72 X |
| 2,874,316 | 2/1959 | Murdoch, Jr. | 259/72 X |
| 3,539,117 | 11/1970 | Sjogren | 259/72 X |

*Primary Examiner*—Charles N. Hart
*Assistant Examiner*—Robert H. Spitzer
*Attorney, Agent, or Firm*—McDougall, Hersh & Scott

[57] ABSTRACT

An apparatus for causing coagulation or flocculation of a waste fluid discharge from a vibrational treatment device is disclosed. The apparatus is attached to said treatment device and vibrates therewith mixing a flocculating agent into the waste fluid. The fluid and newly formed floccules are then discharged from the apparatus for subsequent filtering. The apparatus employs a siphon-like arrangement to obtain greater efficiency under a continuous flow mode of operation.

4 Claims, 2 Drawing Figures

3,893,921

FLOCCULATION DEVICE FOR WASTE FLUID TREATMENT

BACKGROUND OF THE INVENTION

This invention relates to the field of purification of industrial waste fluids. In particular, the surface machining or treatment of parts may be accomplished in a vibrational scouring device. Such a device employs a fluid shower in the scouring process. After use, this fluid contains waste impurities which require removal before the fluid is re-used or discharged into a sewer system.

Prior purification systems have usually employed a separate installation following the surface treatment apparatus. Such an installation includes a propeller or other mixing device in a stationary tank for adding a coagulating, or more accurately, a flocculating agent to the waste fluid. After flocculation the floccules are filtered from the fluid. This arrangement has the disadvantage of requiring a separate installation which must be synchronously operated with the scouring apparatus. Such a system requires separate maintenance and must be carefully monitored to assure that the processing rate is compatible with the discharge rate of the scouring apparatus. It has further been found that relatively large capacity flocculating tanks are required in these installations.

It is accordingly an object of the present invention to provide a flocculation device integral with the treatment apparatus.

Another object of the invention is to provide a flocculation device which utilizes the vibratory motion of the treatment device to mix the flocculating agent with the waste fluid.

It is a further object of the invention to provide a flocculation system of substantially smaller size capable of continuous operation.

A still further object is to provide a flocculation device in which the inlet and outlet are in syphon-like relation.

Other objects of the present invention will be apparent from the remaining portion of the specification.

SUMMARY OF THE INVENTION

An apparatus for flocculating waste fluid includes a tank attached to a vibrating treatment device from which the waste fluid is discharged. A variable rate pump or other means injects a flocculating agent into the tank, where it is effectively mixed with the waste fluid due to the vibration of the treatment device. The waste fluid containing the flocculated material in suspension is then discharged from the tank for subsequent separation, as by filtration, centrifuge or the like.

DETAILED DESCRIPTION

Figure 1:
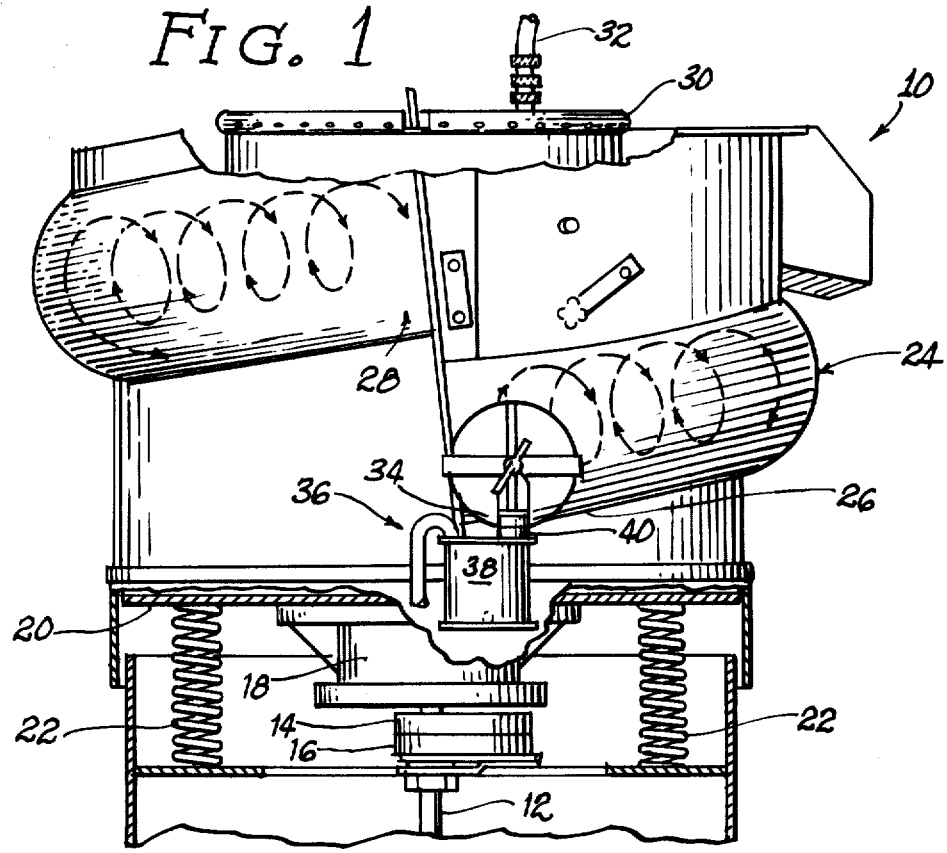
FIG. 1 is a side view of a surface treatment machine showing the flocculation device of the present invention mounted thereto, and, FIG. 2 is an enlarged cross-sectional view of a portion of the flocculation device shown in FIG. 1.

Referring to FIG. 1, a portion of a vibration scouring device having a flocculating apparatus according to the present invention installed thereon is shown. The vibrational scouring device 10 is operated by a drive shaft 12 having eccentrics 14 and 16 thereon for rotational movement therewith. The shaft 12 is rotated by a motor, not shown. The shaft on which the eccentrics are mounted, is journaled in a bearing fixed to a base 20 resiliently supported on coil springs 22, whereby a gyratory movement is imparted to the base responsive to rotational movement of the shaft.

Briefly described, the vibratory chamber illustrated is in the form of an elongated tubular member 24 extending in an upward spiral, and is fixed on the base for vibratory movement therewith. In operation, the blanks, in the form of parts or articles, are introduced into the lower end portion of the chamber along with finishing media or scouring agents such as aluminum oxide powder, emery powder and the like particulate material. In response to vibrational movement, the parts and media are subjected to surface engagement as the parts travel in an orbital path (see arrows) about the chamber while advancing upwardly along the spiral path from the lower zone 26 of the chamber to an outlet in the upper end 28. It will be understood that the invention may be practiced with other devices for surface treatment of parts with media in response to vibratory action.

As the blanks pass upwardly in the scouring chamber 24 they are subjected to a fluid bath. The fluid typically will be a water based solution of rust inhibitors, and/or mild acids to enhance scaling of the surfaces of the blanks. The fluid is supplied by a hose 32 to an annular shower ring 30 located above the chamber, preferably in axial alignment with the inner annular wall of the spiral chamber with the spray opening facing outwardly and downwardly into the open top of the chamber. The shower ring uniformly distributes the fluid into the chamber 24. As the fluid passes downwardly through the scouring chamber it picks up waste material generated during surface treatment, including abrasive particles and material from the surface of the blanks under treatment.

Figure 2:
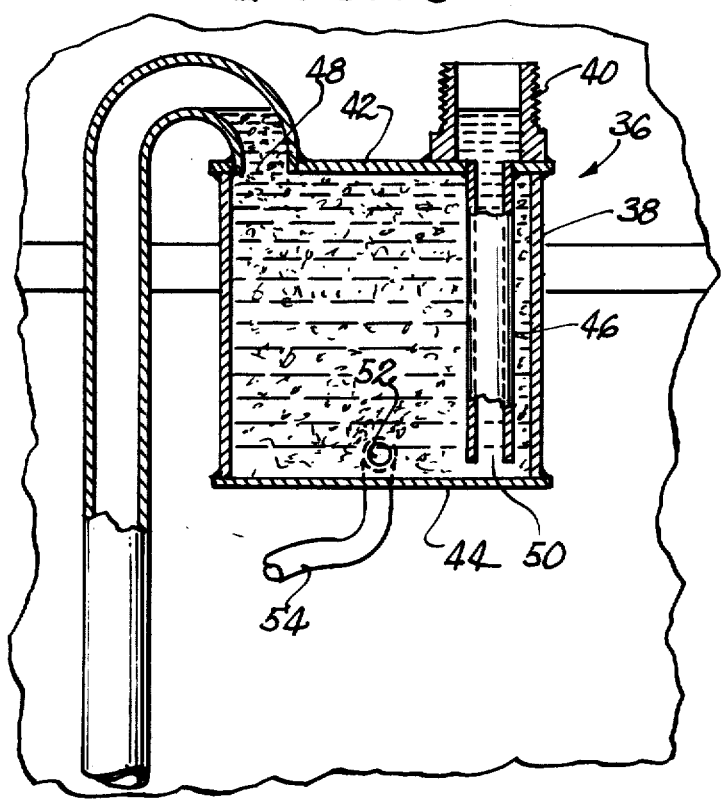

At the lower end 26 of the chamber 24, the fluid with entrained material, is collected and passed through a fluid discharge orifice 34 to a flocculation device 36, according to the present invention. The device includes a cylindrical tank 38 rigidly connected to the orifice 34 by a pipe coupling 40 having external threads for mating with internal threads on orifice 34. Referring to FIG. 2, the tank 38 has upper and lower cover plates 42 and 44, the coupling 40 being rigidly connected to the upper plate 42. A pipe section 46 provides an isolated inlet passage for the fluid from orifice 34 to an outlet in the lower portion of the tank 38 adjacent lower plate 44. The upper plate or wall is provided with a fluid outlet 48 spaced from the inlet 40–46 and which communicate with the interior of the tank.

As will be apparent, waste fluid from the scouring tank flows into the flocculation tank adjacent the lower plate 44. Located near the discharge end 50 of inlet pipe 46 is a flocculating agent inlet 52 connected by flexible hose 54 to a variable rate pump not shown. A predetermined quantity of flocculating agent such as highly molecular polymer agents or solutions of aluminum are injected into the tank 38 for admixture with the waste fluid therein.

Flocculation is understood to mean the process of producing small, loosely aggregated masses of material suspended in a liquid, while the formed aggregate is referred to as a floccule. In the present case the floccule includes waste material picked up by the fluid in the scouring process. Thus, as the waste fluid enters the flocculation tank 38 it is brought into active relation with the flocculating agent by the vibrational action.

The arrangement of the inlet 46 and the outlet 48 is of special importance in this regard. The incoming waste fluid enters near the bottom of the tank and the reaction product with the flocculating agent under vibrational action is discharged near the top at a point remote from the inlet. This prolongs the time for vibratory action between the agent and the waste fluid to produce floccules. Upon being exhausted from the flocculation tank through the outlet 48, the waste fluid passes through filtering or other separating means which remove the floccules such as by centrifugation, decantation, or the like. The purified fluid can then be discharged into a sewage system, further treated, or in some cases, reused.

The novel concept of utilizing the vibrational energy from the scouring tank to react the waste fluid and flocculation agent eliminates any need for a separate mixing system. The vibrational energy transmitted to the tank 38 via the coupling 40 should not be excessive or it will interfere with formation of the floccules. Oscillations having an amplitude of 3 to 10 mm and a frequency on the order of 1,000 oscillations per minute have proved satisfactory.

Another restraint upon the present invention is that the flocculation tank not be so large as to adversely affect the operation of the scouring tank. In this regard, it has been discovered that, due to the highly effective mixing obtained according to the present invention, a small volume flocculating tank can process the waste fluid from a relatively large scouring tank on a continuous basis. For example, satisfactory flocculation has been obtained using a flocculating tank of 1 liter mounted to a scouring tank of 60 liters.

While the described embodiment is preferred, it is also contemplated to use a flocculating tank in the form of an ascending spiral container. As in the preferred embodiment, the flocculating agent would be injected near the inlet. The discharge outlet would be provided at the top of the spiral.

While I have shown and described an embodiment of this invention in some detail, it will be understood that this description and illustration are offered merely by way of example, and that the invention is to be limited in scope only by the appended claims.

We claim:

1. An apparatus for flocculation of a waste fluid discharge comprising:

a vibrational treatment device;

a tank connected to and vibrating with said treatment device and receiving said waste fluid via a first inlet communicating with said tank adjacent a bottom surface thereof;

means for supplying a flocculating agent to said tank including a second inlet in the proximity of said first inlet through which said flocculating agent is injected into said tank to effect flocculation of said waste fluid upon mixing therewith due to the vibration of said tank; and means for discharging the floccule-containing waste fluid from said tank.

2. The apparatus in claim 1 wherein said tank is rigidly attached to said treatment device for vibration therewith.

3. The apparatus in claim 1 wherein said discharging means discharges said floccule-containing waste fluid from an outlet communicating with said tank at a top surface thereof, said first inlet and said outlet being arranged in siphon-like relation.

4. The apparatus in claim 1 wherein the fluid capacity of said tank is at least 10 times smaller than that of said treatment device.

* * * * *